(12) United States Patent
Abe et al.

(10) Patent No.: US 7,159,218 B2
(45) Date of Patent: Jan. 2, 2007

(54) SYSTEM, METHOD, AND PROGRAM FOR CONTROLLING EXECUTION SEQUENCING OF MULTIPLE JOBS

(75) Inventors: Atsushi Abe, Yokohama (JP); Tsuyoshi Miyamura, Yokohama (JP)

(73) Assignee: Lenovo (Singapore) Pte. Ltd. (SG)

( * ) Notice: Subject to any disclaimer, the term of this patent is extended or adjusted under 35 U.S.C. 154(b) by 738 days.

(21) Appl. No.: 10/083,227

(22) Filed: Feb. 26, 2002

(65) Prior Publication Data
US 2002/0129083 A1   Sep. 12, 2002

(30) Foreign Application Priority Data
Mar. 9, 2001   (JP)   ............................. 2001-066769

(51) Int. Cl.
G06F 9/44   (2006.01)
G06F 9/46   (2006.01)
(52) U.S. Cl. .................................................. 718/102
(58) Field of Classification Search ........ 718/100–108, 718/1; 709/226; 714/38, 31, 47; 705/8, 705/22
See application file for complete search history.

(56) References Cited

U.S. PATENT DOCUMENTS

| | | | | |
|---|---|---|---|---|
| 5,522,070 A | * | 5/1996 | Sumimoto | 718/104 |
| 5,623,404 A | * | 4/1997 | Collins et al. | 705/9 |
| 5,819,232 A | * | 10/1998 | Shipman | 705/8 |
| 5,881,264 A | * | 3/1999 | Kurosawa | 712/217 |
| 6,009,452 A | * | 12/1999 | Horvitz | 718/102 |
| 6,086,628 A | * | 7/2000 | Dave et al. | 716/7 |
| 6,110,220 A | * | 8/2000 | Dave et al. | 716/3 |
| 6,112,023 A | * | 8/2000 | Dave et al. | 703/27 |
| 6,189,022 B1 | * | 2/2001 | Binns | 718/100 |
| 6,557,120 B1 | * | 4/2003 | Nicholson et al. | 714/38 |
| 6,567,840 B1 | * | 5/2003 | Binns et al. | 718/103 |
| 6,571,298 B1 | * | 5/2003 | Megiddo | 710/5 |
| 6,574,676 B1 | * | 6/2003 | Megiddo | 710/5 |
| 6,745,222 B1 | * | 6/2004 | Jones et al. | 718/107 |
| 7,000,232 B1 | * | 2/2006 | Jones et al. | 718/102 |

OTHER PUBLICATIONS

Atlas, Alia et al. "Statistical Rate Monotonic Scheduling." Technical Report BUCS-TR-98-010, Boston University, 1998.□□.*
Bestavros, Azer et al. "Probabilistic Job Scheduling for Distributed Real-time Applications." Computer Science Department, University of Boston. 1993.*

(Continued)

Primary Examiner—Lewis A. Bullock, Jr.
(74) Attorney, Agent, or Firm—Carlos Munoz-Bustamante; Dillon & Yudell LLP

(57) ABSTRACT

A system, method, and program product for controlling execution timing of multiple jobs. The job execution scheduling system of the present invention includes job execution means for executing multiple jobs, including a first job which is executed at irregular intervals, and a second job which is executed at regular intervals. The system further includes means for determining a probability distribution of times at which the first job is executed by the job execution means. Execution timing means are utilized for scheduling execution of the second job by the job execution means in accordance with the determined probability distribution.

21 Claims, 12 Drawing Sheets

OTHER PUBLICATIONS

Liberato, Frank et al. "Fault Tolerant Real-time Global Scheduling on Multiprocessors." Department of Computer Science, University of Pittsburgh. 1993.*

Jeffay, Kevin et al. "On Non-Preemptive Scheduling of Periodic and Sporadic Tasks." IEEE. Dec. 1991.*

Davis, Robert et al. "Optimal Priority Assignment for Aperiodic Tasks with Firm Deadlines in Fixed Priority Pre-emptive Systems." 1995.*

Ramos-Thuel, Sandra et al. "On-Line Scheduling of Hard Deadline Aperiodic Tasks in Fixed Priority Systems." IEEE. 1993.*

Lehoczky, John P. et al. "An Optimal Algorithim for Scheduling Soft-Aperiodic Tasks in Fixed-Priority Preemptive Systems." IEEE. 1992.*

* cited by examiner

[Figure 1]
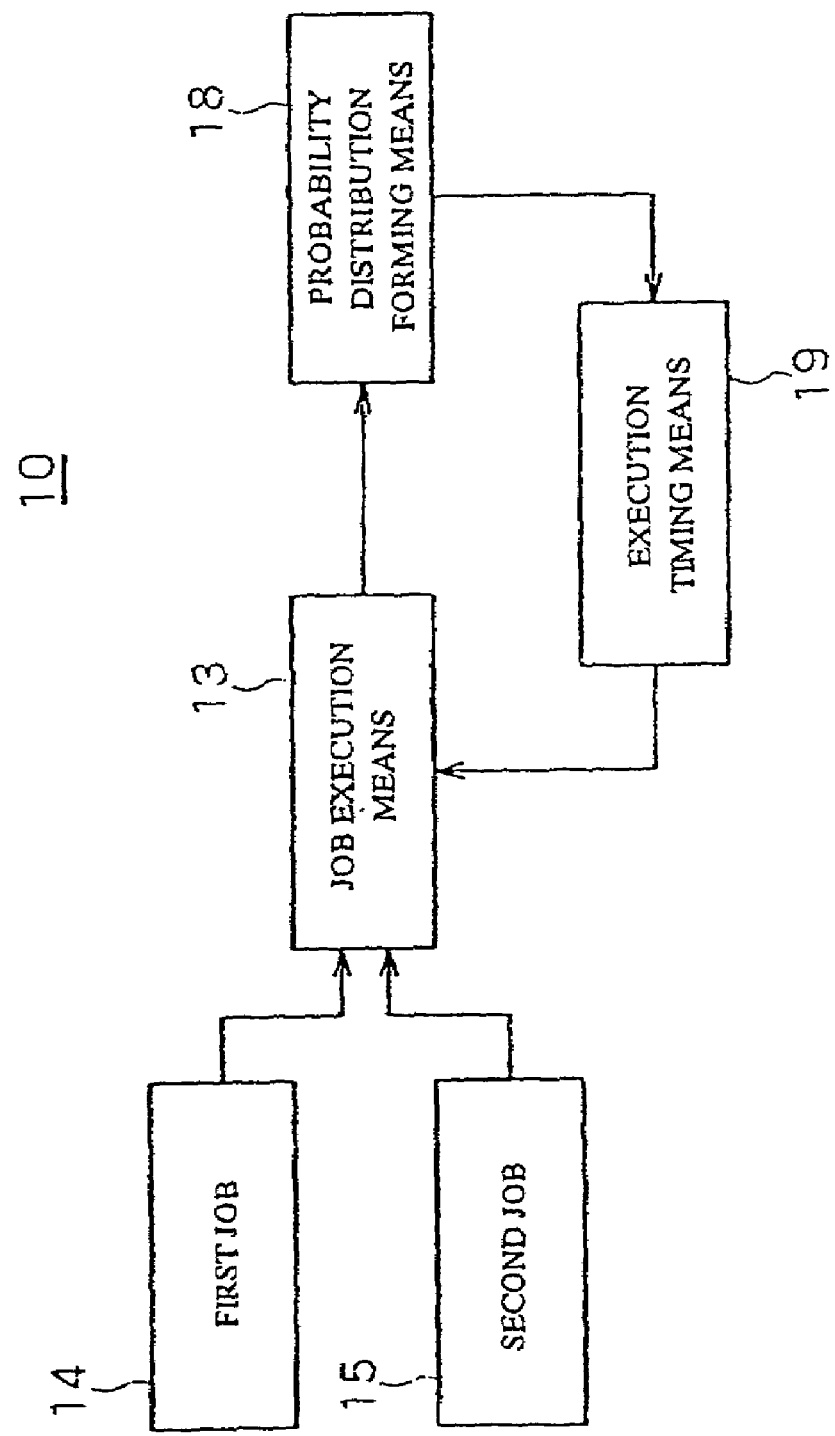

[Figure 2]
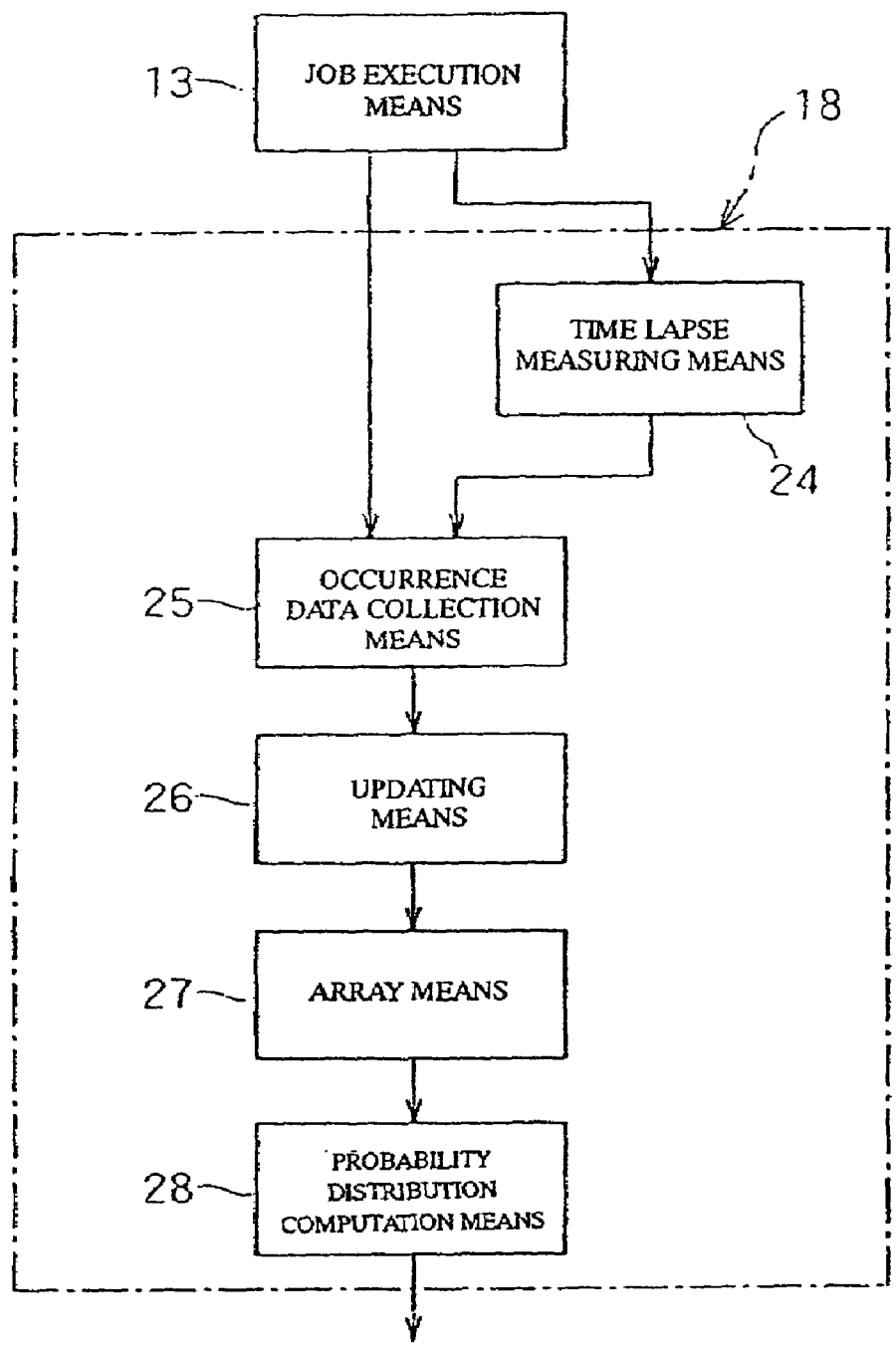

[Figure 3]
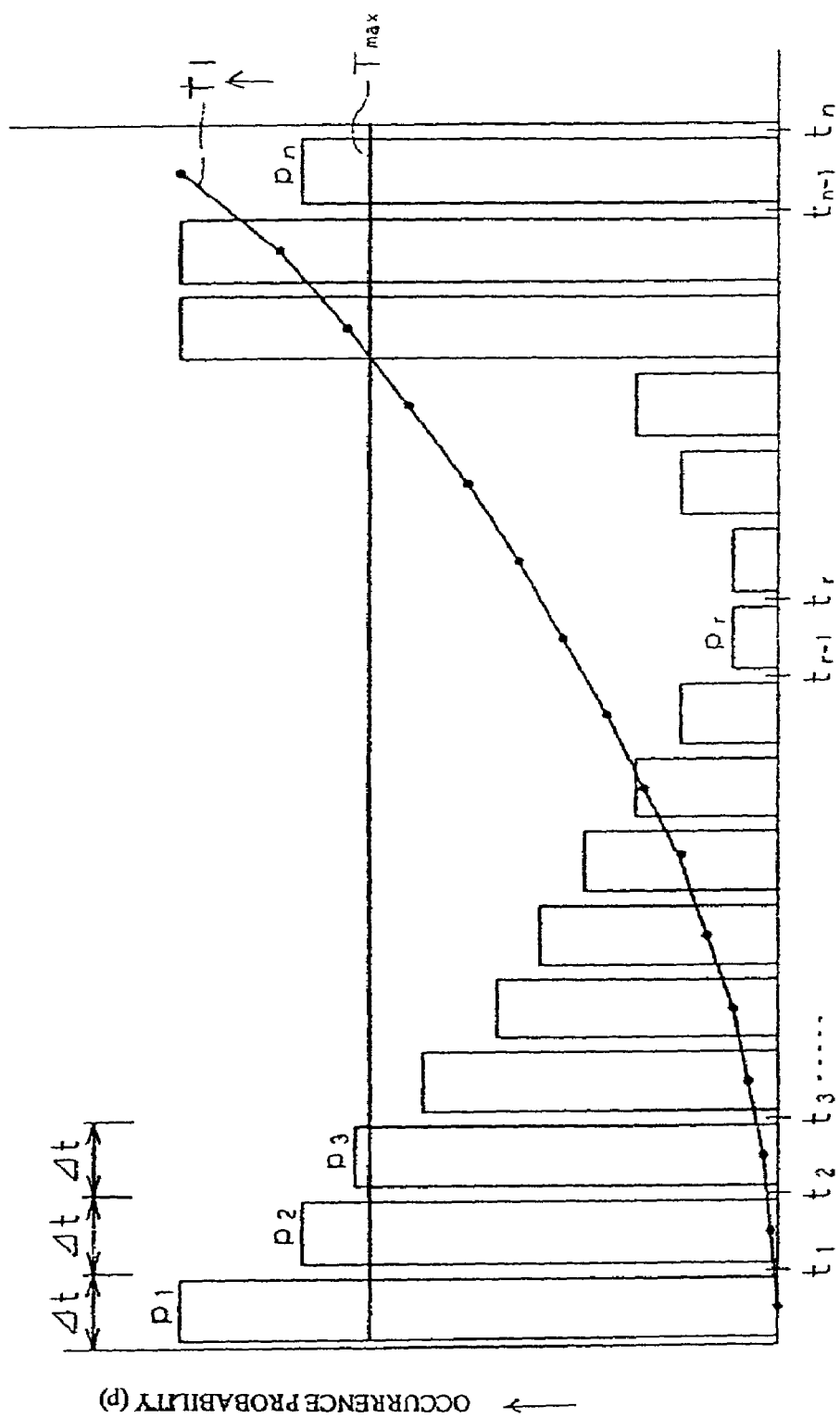

[Figure 4]
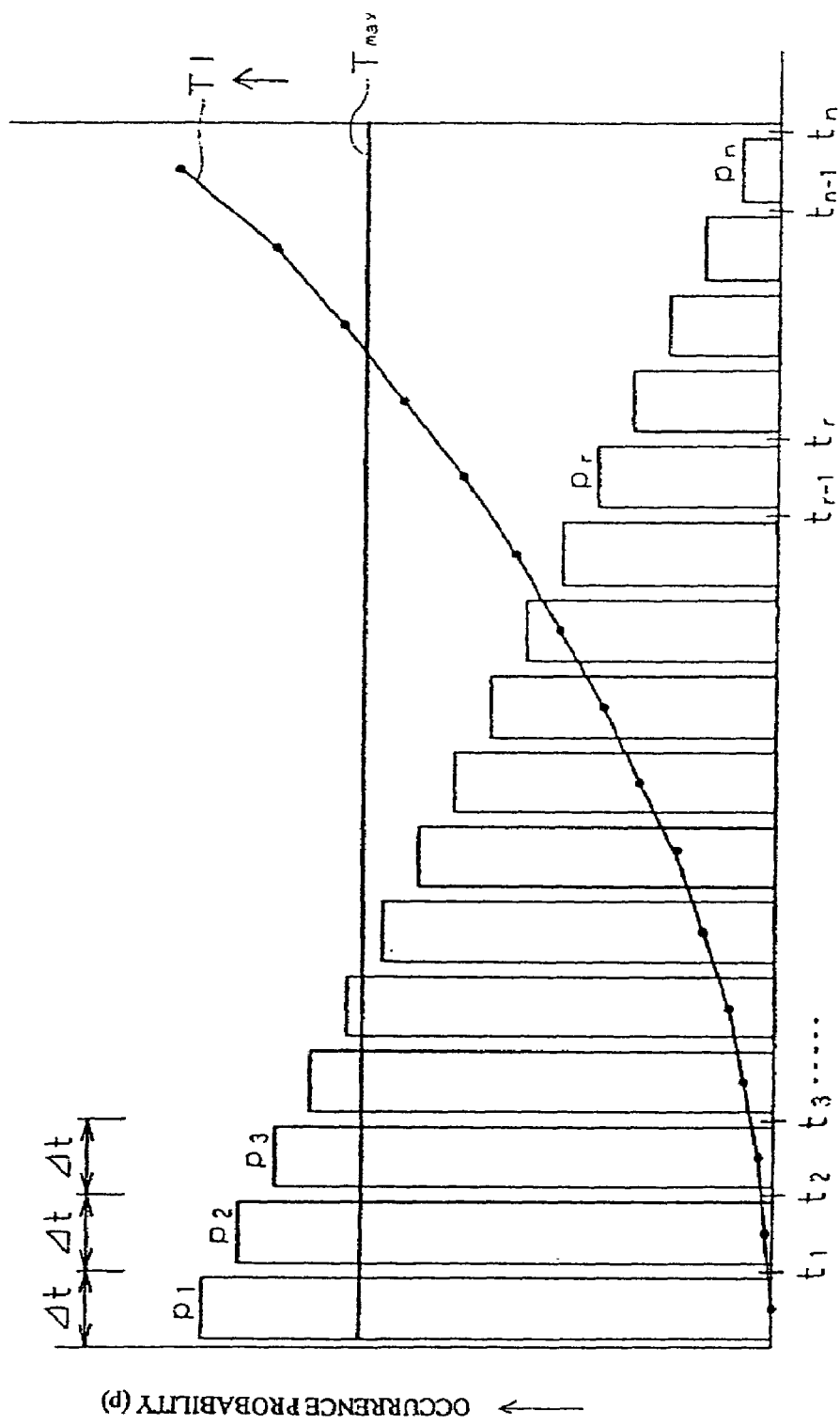

[Figure 5]
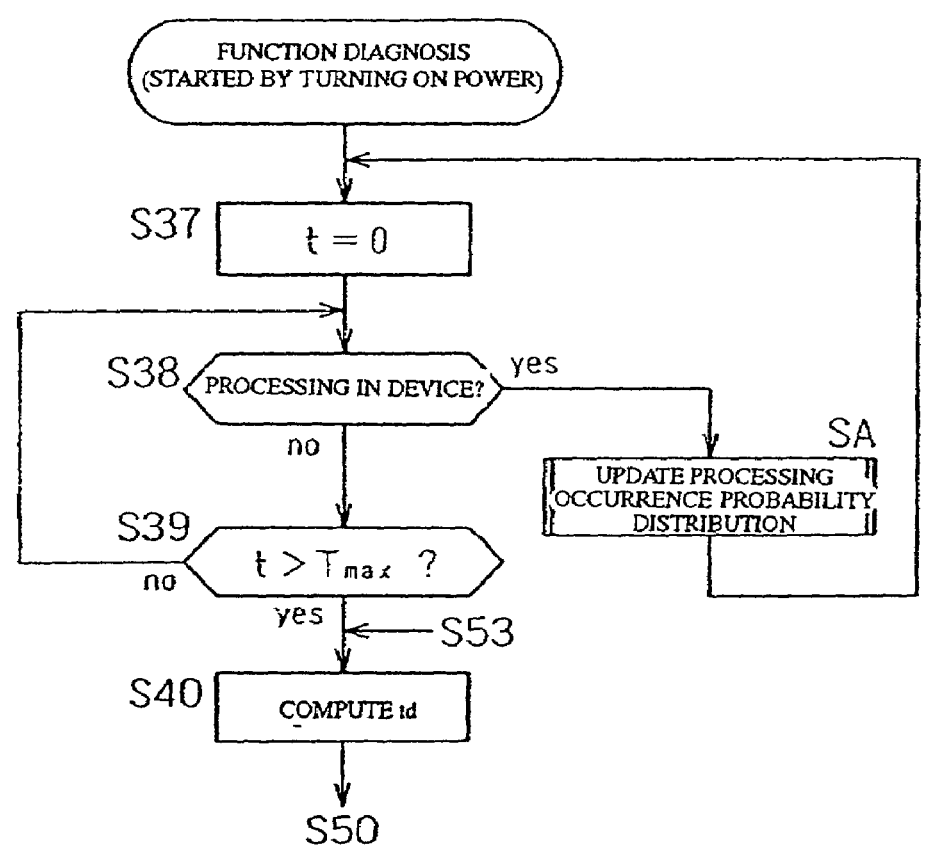

[Figure 6]
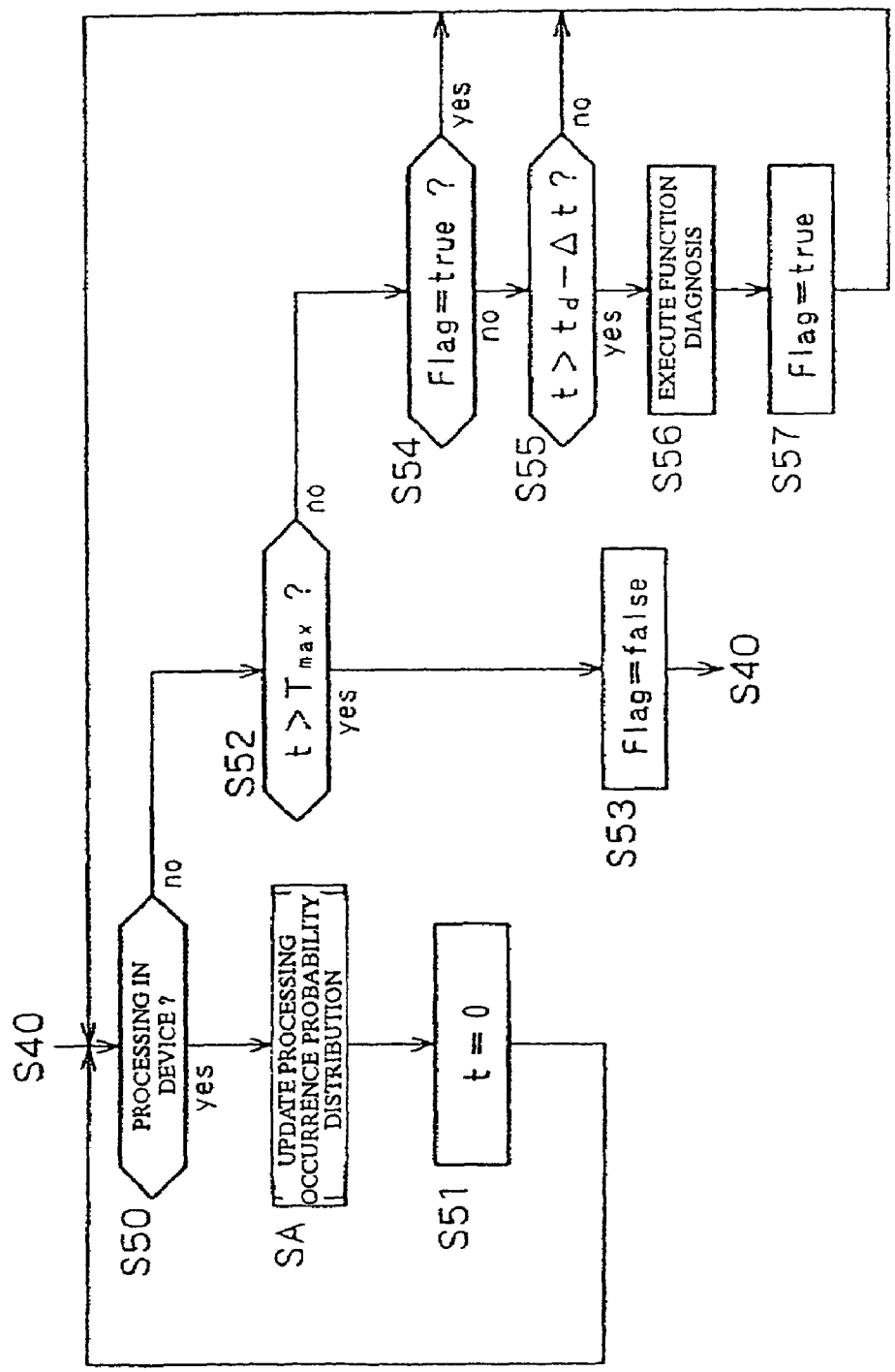

[Figure 7]
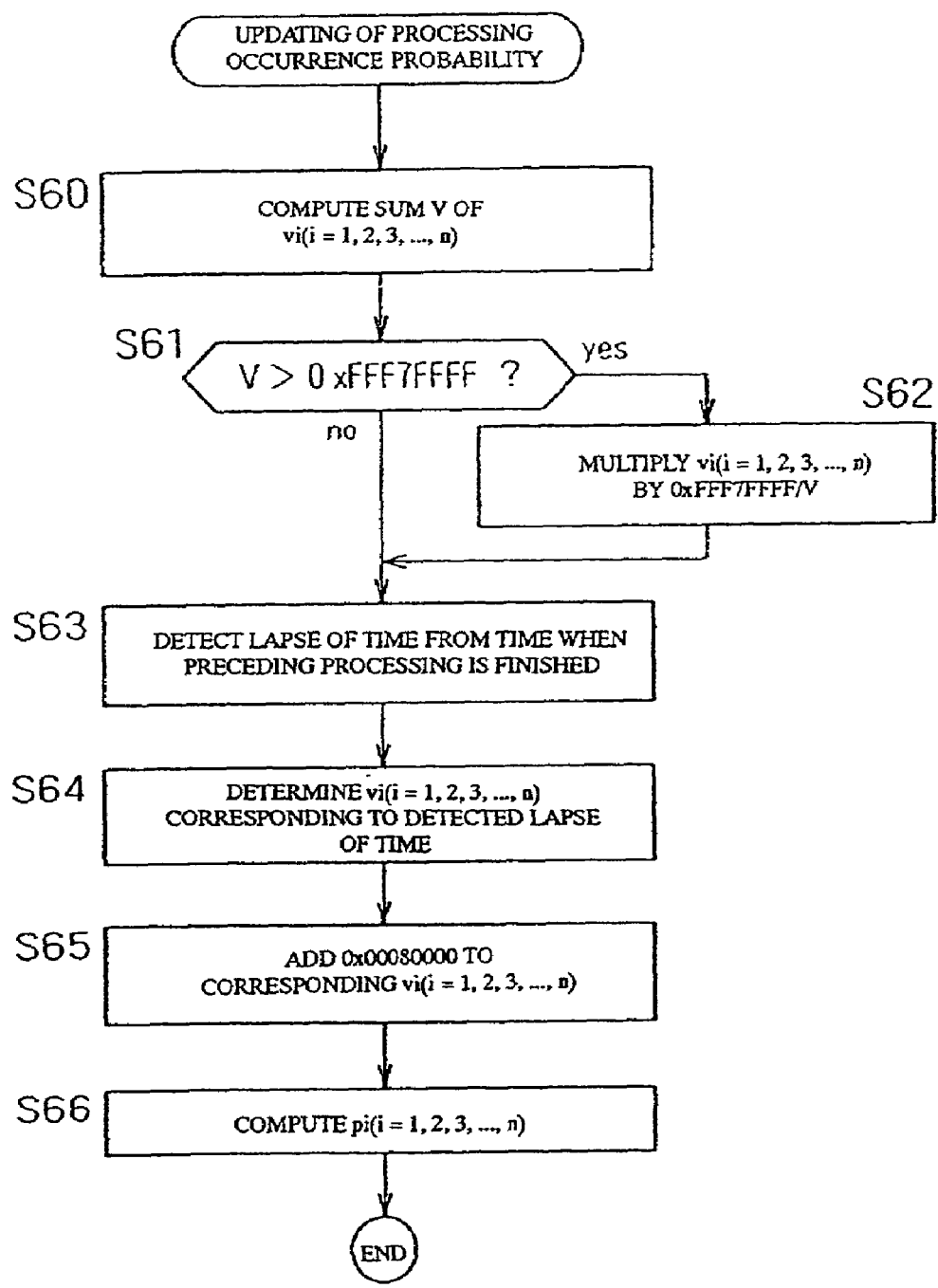

[Figure 8]
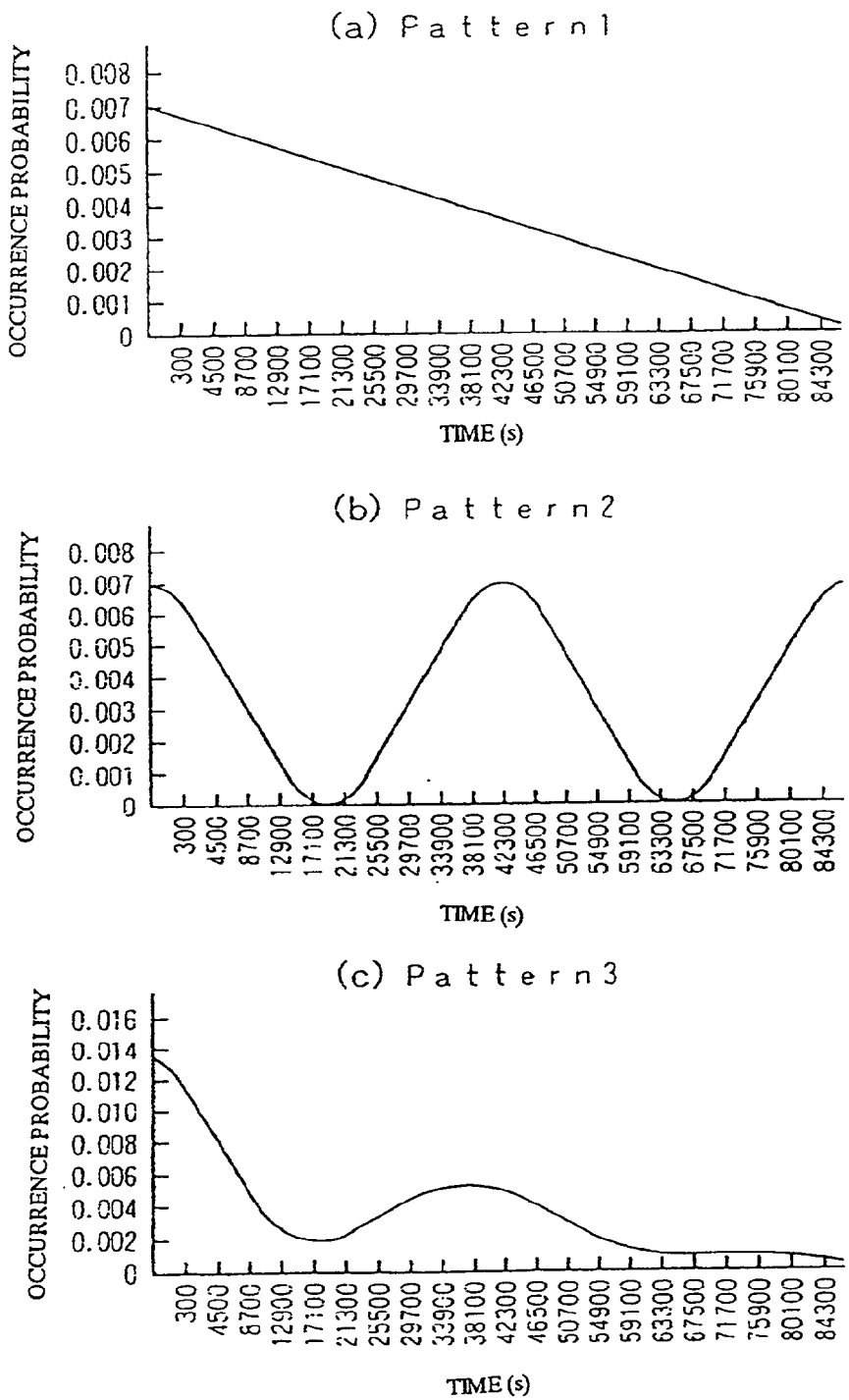

[Figure 9]

| | Pattern1 | Pattern2 | Pattern3 |
|---|---|---|---|
| PERIOD (DAYS) | 13,659 | 20,613 | 12,690 |
| OVERLAPPING RATE (CONVENTIONAL METHOD) (TIMES/YEAR) | 0.75 | 0.50 | 0.82 |
| OVERLAPPING RATE (PROPOSED METHOD) (TIMES/YEAR) | $4.21 \times 10^{-6}$ | $3.72 \times 10^{-6}$ | $9.02 \times 10^{-6}$ |
| RATIO OF OVERLAPPING RATES (%) | $5.61 \times 10^{-4}$ | $7.44 \times 10^{-6}$ | $1.10 \times 10^{-4}$ |

[Figure 10]
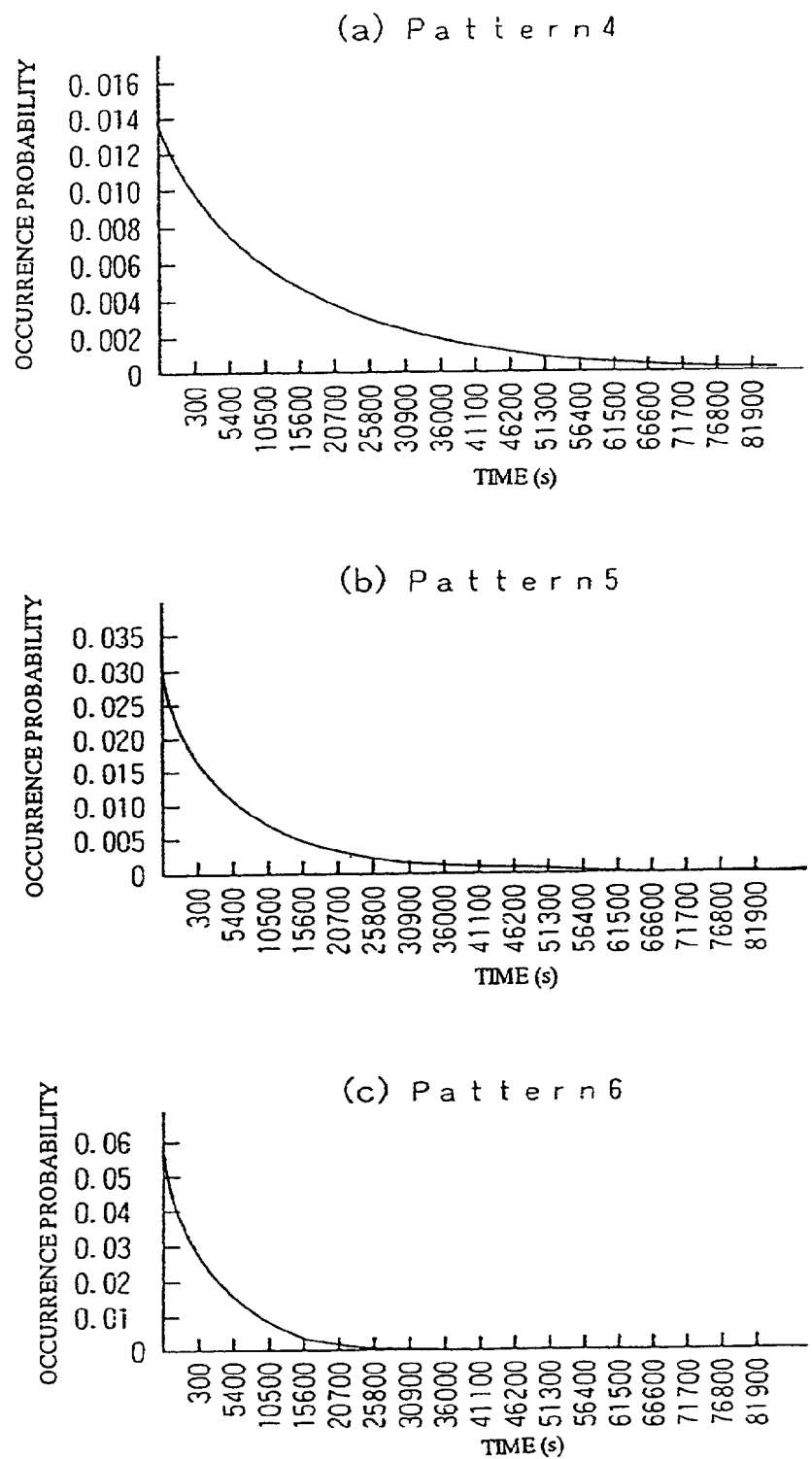

[Figure 11]

| | Pattern4 | Pattern5 | Pattern6 |
|---|---|---|---|
| PERIOD (DAYS) | 90,840 | 5,861 | 2,674 |
| OVERLAPPING RATE (CONVENTIONAL METHOD) (TIMES/YEAR) | 1.05 | 1.77 | 3.88 |
| OVERLAPPING RATE (PROPOSED METHOD) (TIMES/YEAR) | $7.52 \times 10^{-6}$ | $9.44 \times 10^{-6}$ | $2.46 \times 10^{-5}$ |
| RATIO OF OVERLAPPING RATES (%) | $7.16 \times 10^{-4}$ | $5.33 \times 10^{-6}$ | $6.34 \times 10^{-4}$ |

[Figure 12]

$$T_1 = \sum_{k=1}^{n} p_k t_k \quad \ldots (1)$$

$$T_2 = \sum_{k=1}^{n} p_k t_k \sum_{i=0}^{\infty} p_1^i \quad \ldots (2)$$

$$T_\ell = \sum_{k=1}^{n} p_k t_k \sum_{i=0}^{\infty} \left( \sum_{j=1}^{\ell-1} p_j \right)^i = \frac{\sum_{k=1}^{n} p_k t_k}{1 - \sum_{j=1}^{\ell-1} p_j} \quad \ldots (3)$$

SYSTEM, METHOD, AND PROGRAM FOR CONTROLLING EXECUTION SEQUENCING OF MULTIPLE JOBS

This application claims the priority benefit of Japanese Patent Application No. 2001-066769, filed on Mar. 9, 2001, and entitled "Apparatus, Method and Program for Controlling Execution of Jobs."

BACKGROUND OF THE INVENTION

1. Technical Field

The present invention relates to an system, method and program for controlling execution sequencing of multiple jobs to improve overall job execution efficiently and, more particularly, to an system, method and program for controlling the execution timing of jobs in such a manner that while execution of one job occurs at irregular and singularly unforeseeable time intervals, another job can be executed while limiting execution overlap with the former.

2. Description of the Related Art

An example of a multi-job processing scenario occurs in a tape drive that is externally connected to a computer, wherein a function diagnosis program is executed. As part of the function diagnosis program, it may be useful to check in advance the possibility of failure due to degradation with time in a portion of a memory. Conventionally, such a function diagnosis program is executed at regular time intervals.

Published Unexamined Patent Application No. 5-242103 discloses a job scheduling system in which a plurality of jobs to be executed successively can be executed with efficiency in spite of occurrence of machine failure with certain probability. In this scheduling system, the maximum, average, and minimum time periods allocated to jobs in a machine are computed. The time allocated for each job is divided into three (first to third) time segments, and the first segment for one job is suitably positioned in time relative to the third segment for the preceding job. That is, the subsequent job earliest and latest start times are suitably set relative to the preceding job earliest and latest end times.

Ordinarily, a tape drive is a single-tasking device and executes processing for reading data from or writing data to a tape as its essential job. If such a tape drive receives an instruction to read or write data while executing a function diagnosis program, it must wait before executing the regular job. Even in the case of a device capable of multitasking, execution of processing based on a function diagnosis program or the like during execution of regular processing often leads to a reduction in the speed of the regular processing or occurrence of a failure.

The scheduling system disclosed in Published Unexamined Patent Application No. 5-242103 is effective in allocating to a machine a plurality of jobs with substantially fixed execution start times and execution order. However, it is incapable of scheduling a plurality of jobs in a machine in which requests for execution of a regular job occur unforeseeably. The present invention addresses the foregoing shortcomings in prior art job scheduling techniques.

SUMMARY OF THE INVENTION

An object of the present invention is to provide an system, method and program for controlling execution scheduling of jobs in such a manner that, in a device in which execution of a first job occurs at irregular (i.e. singularly unforeseeable intervals) intervals, the execution of a second job is scheduled in a manner such that potential execution time overlap with the first job is minimized.

Another object of the present invention is to provide a job execution control system, method and program capable of ensuring execution of the second job at suitable time intervals and with suitable frequency.

The job execution scheduling system of the present invention includes job execution means for executing multiple jobs, including a first job which is executed at irregular intervals, and a second job which is executed at regular intervals. The system further includes means for determining a probability distribution of times at which the first job is executed by the job execution means. Execution timing means are utilized for scheduling execution of the second job by the job execution means in accordance with the determined probability distribution.

All objects, features, and advantages of the present invention will become apparent in the following detailed written description.

BRIEF DESCRIPTION OF THE DRAWINGS

FIG. 1 is a functional block diagram of a job execution apparatus having a dynamic diagnosis function in accordance with a preferred embodiment of the present invention;

FIG. 2 is a block diagram depicting details of probability distribution forming means employed in a preferred embodiment of the present invention;

FIG. 3 is a diagram showing a first exemplary probability distribution utilized in one embodiment of the present invention;

FIG. 4 is a diagram illustrating a second exemplary probability distribution utilized in an alternate embodiment of the present invention;

FIG. 5 is a flowchart depicting first steps in a routine for controlling execution timing of a function diagnosis program;

FIG. 6 is a flowchart illustrating subsequent steps in a routine for controlling execution timing of a function diagnosis program;

FIG. 7 is a flowchart showing in further detail the update processing occurrence probability distribution step illustrated in FIGS. 5 and 6;

FIG. 8 is a diagram depicting three probability distribution patterns obtained by a simulation performed to examine the effect of the proposed method of the present invention;

FIG. 9 is a diagram comparing the rate of overlap between a first job a second job when the second job is executed by a conventional scheduling method and the proposed method of the present invention with respect to each pattern of the function diagnosis program shown in FIG. 8;

FIG. 10 is a diagram illustrating three probability distribution patterns obtained by alternate simulation performed to examine the effect of the proposed method of the present invention;

FIG. 11 is a diagram comparing the rate of overlap between a first job a second job when the second job is executed by the conventional method and the proposed method of the present invention with respect to each pattern of the function diagnosis program shown in FIG. 10; and FIG. 12 is a diagram depicting formulas utilized in the process of obtaining an expectation in accordance with a preferred embodiment of the present invention.

DETAILED DESCRIPTION OF THE PREFERRED EMBODIMENT

This invention is described in a preferred embodiment in the following description with reference to the figures. While this invention is described in terms of advantageous modes for achieving this invention's objectives, it will be appreciated by those skilled in the art that variations may be accomplished in view of these teachings without deviating from the spirit or scope of the present invention.

The present invention is operable with respect to two categories of jobs. The first category consists of jobs that are executed at irregular time intervals and the second category consists of jobs that occur at regular time intervals. For ease of reference and explanation the following descriptions will utilize "first job" in reference to jobs in the first category and "second job" in reference to jobs within the second category. The job execution means with which the present invention is implemented may be of either a single-tasking or a multi-tasking type. If the job execution means is, for example, a tape drive, a first job executed at irregular time intervals (i.e. individual occurrences unpredictable) is, for example, a job relating to reading data from a tape or writing data to the tape. A second job that is executed at regular time intervals is, for example, a function diagnosis program for recognizing in advance the possibility of occurrence of failure due to deterioration of the tape with time. If the job execution means is, for example, a main computer unit, the second regularly occurring job maybe, for example, a job employed in support of an anti-virus program, a scan-disk program and/or a Defrag program. For a situation in which a user is using a word processor application on a personal computer, the first singularly unforeseeable job may be a word processing job relating to editing sentences, and the second regularly occurring job may be a job using a program for automatically saving a file during editing of the file. If, on the other hand, the job execution means is a server, the first job may be a job relating to a request from a client while the second job is a job relating to backup of data in the server.

It should be noted that the first job is not limited to only one type of job, e.g., a read/write job in the job execution means. If the job execution means is, for example, a computer with an operating system capable of multitasking, the first job may comprise a plurality of jobs using different programs, e.g., a job relating to a spreadsheet software, a job relating to a word processor, and a job relating to a Web browser, while the second job may be a job relating to an anti-virus program. Also, the second job is not limited to only one kind of job, e.g., a job relating to an anti-virus program in the job execution means. If the job execution means is, for example, a computer, the second job may comprise a plurality of jobs using different programs, e.g., a job relating to an anti-virus program and a job relating to an automatic file backup program while the first job is a job relating to spreadsheet software. In accordance with the inventive principles disclosed herein, the second job is to be performed at predetermined time intervals by referring to the probability distribution of the first job but does not need to be executed under absolute timing requirements. Processing means for determining the probability distribution may be executed as the second job by the job execution means or may be performed by a CPU or the like separate from the job execution means.

According to a first embodiment of the present invention, the time at which a second job is to be executed is not limited to a time in the interval corresponding to the minimum probability in the probability distribution of occurrence of the first job. For example, if the probability of occurrence of the first job is generally constant without a significant variation and is lower than a reference value throughout a sequence of some of the intervals, the first or an intermediate one of the sequence of intervals may be selected as a time period for execution of the second job, even if the selected time period does not correspond to the minimum occurrence probability. Furthermore, if the probabilities in the preceding and subsequent intervals about the minimum-occurrence-probability interval are extraordinarily large, and if it is predicted that the current instance of the second job will require a longer processing time, the interval corresponding to the second or third lowest occurrence probability may be selected as a time period for execution of the second job.

The execution timing means of the present invention computes the optimum time to execute the second job by considering the probability distribution for the first job regarding occurrence times from a predetermined viewpoint. The second job is executed at the time determined by the execution timing means. Thus, the time to perform the first job and the time to perform the second job are conditioned relative to each other to enable each of the first and second jobs to be suitably performed by the job execution means.

According to a second embodiment of the present invention, within the job execution control apparatus according to the first embodiment of the present invention, the starting point of the probability distribution is set to the time at which the first job has completed execution. The starting point of the probability distribution may be set at a particular time of day (e.g. 12:00 p.m. or 9:00 a.m.) that corresponds to a business start time. However, the first job occurrence probability distribution ordinarily has a set periodicity. Therefore, setting the starting point of the probability distribution at the time at which the job execution means has finished the first job is more effective in improving the reliability of the probability distribution.

In according with a third embodiment of the present invention, within the job execution control apparatus according to the first or second embodiments of the present invention, the means for forming the probability distribution computes the probability distribution with respect to time zones, week-day zones and/or seasonal zones, and the execution timing means schedules execution of the second job on the basis of the probability distribution according to the current time, the current day in a week and/or the current season.

The first job occurrence probability distribution may have different characteristic patterns relating to a daytime zone and a nighttime zone, a midnight and early-morning zone and the other time zone, Saturday and a weekday other than Saturday, or summer and winter. If different patterns of the probability distribution are prepared with respect to time zones, week-day zones and/or seasonal zones, timing of execution of the second job can be optimized according to circumstances.

According to a fourth embodiment of the present invention, within the job execution control apparatus according to any one of the first, second, or third embodiments of the present invention, the means for forming the probability distribution forms the probability distribution on the basis of a predetermined number of latest data items or data in a predetermined last period in the data about the times at which the first job was executed.

Some job execution means may have the first job occurrence probability distribution abruptly changed due to a change in the system environment or the like. In such a case, exclusive use of a predetermined number of latest data items or data in a predetermined last period for forming the probability distribution enables scheduling of the second job execution time to quickly adapt to the change in the system environment or the like.

In accordance with a fifth embodiment of the present invention, in the job execution control apparatus according to any one of the first four embodiments of the present invention, the probability distribution forming means includes: time lapse measuring means for measuring a lapse of time from the time at which the first job executed by the job execution means is finished; array means having array elements corresponding to a plurality of intervals defined by dividing the lapse of time from the time at which the execution of the first job is finished; updating means for monitoring occurrences of first job execution, and for updating the value of the array element related to the first job execution lapse interval; and probability distribution computation means for computing the probability of occurrence of the first job in each interval on the basis of the value of the corresponding array element to form the entire probability distribution. Thus, when the first job is executed, the values of the array elements corresponding to the occurrence times are updated to form the probability distribution with reliability. Updating of the probability distribution by the probability distribution forming means may be performed each time the first job is executed.

In accordance with a sixth embodiment of the present invention, in the job execution control apparatus according to the fifth embodiment, the length of each of the intervals is set longer than the time period required to process the second job. For a case in which the second job execution time is set in correspondence with each interval of the probability distribution, and where the length of the probability distribution interval is shorter than the time required to process the second job, the possibility of overlapping with the first job is high if the probability in the subsequent interval is high, even when the probability in the interval of the second job execution time period is low. If the length of the interval is set longer than the time required to process the second job, the optimum time to execute the second job can be simply determined from the probability in each interval. Therefore, the length of the interval is preferably set to a value several times (e.g., six times) larger than the time required by the job execution means to process the second job.

According to a seventh embodiment of the present invention, the job execution control apparatus according to any one of the first sixth embodiments of the present invention further includes comparison means for comparing a reference value, Tmax, with a non-occurrence duration, t, defined as a time period during which no execution processing of the first job occurs from the point in time at which the first job execution is finished; and execution inhibition means for inhibiting the job execution means from subsequently executing the second job until the condition, non-occurrence duration t>reference value Tmax, is satisfied once after execution of the second job.

For a situation in which the optimum second job execution time determined on the basis of the probability distribution is closer to the beginning of the period of the probability distribution because of the existence of a low-probability interval closer to the beginning point of the probability distribution, there is a possibility of the second job being executed unnecessarily frequently. To avoid unnecessarily frequent execution of the second job, execution of the second job may be inhibited until the condition, non-occurrence duration t>reference value Tmax, is satisfied once. In the above-described probability distribution, the non-occurrence duration, $\Delta t$, represents a random variable.

In according with an eighth embodiment of the present invention, the job execution control apparatus according to the seventh embodiment of the present invention further includes interval division means for dividing the lapse of time from the time at which an occurrence of the first job has finished into a plurality of intervals, and which is set as the time start point of the probability distribution; expectation computation means for computing on the basis of the probability distribution, an expectation, $T1$, as a predicted time period before a time after which the second job can be executed after the first job from the end point of one of the intervals in a case where no execution of the first job occurs from the time start point to the end of the interval; minimum probability interval detection means for detecting one of the intervals corresponding to the minimum probability in the intervals between the time start point and Tm, which is the end point of one of the intervals, and wherein $T1$ at the end point of each interval satisfies the condition, $T1$<reference value Tmax with respect to the predetermined reference value Tmax, and which has the greatest remoteness from the time start point; and execution timing means for scheduling execution of the second job in the interval detected by the minimum probability interval detection means.

In general, a second job execution time with a lower possibility of overlapping with an execution of the first job corresponds to the minimum-probability interval in the intervals of the probability distribution. On the other hand, there is a need to immediately execute the second job once the condition: non-occurrence duration $\Delta t$>reference value Tmax is satisfied. The job execution control apparatus in this embodiment executes the second job in the interval where the first job occurrence probability after the condition: $T1$<reference value Tmax has been satisfied, thereby simultaneously achieving limitation of overlapping of the first job execution time and the second job execution time and prompt execution of the second job.

According to a ninth embodiment of the present invention, the job execution control apparatus according to the fifth or eighth embodiment of the present invention further comprises reference value setting means for controllably setting the reference value Tmax. Setting of the reference value Tmax maybe performed in accordance with user input or automatically. For example, it is, in some cases, preferred that the frequency of execution of a function diagnosis program executed to perform a process as the second job in a tape drive should be increased with the increase in operating period. In such a case, enabling adjustment of the reference value Tmax instead of fixing this value is useful.

A job execution control method in accordance with the present invention comprises a probability distribution forming step for determining a probability distribution for times at which execution of a first job occurs, and an execution timing step for timing execution of the second job in accordance with the probability distribution. Preferably, the starting point of the probability distribution is set to the time at which execution of the first job is finished. Preferably, the probability distribution is formed with respect to time zones, week-day zones and/or seasonal zones, and, in the execution timing step, execution of the second job is timed on the basis of the probability distribution according to the current time, the current day in a week and/or the current season. Preferably, the probability distribution is formed in accordance with a predetermined number of latest data items or data in a predetermined last period in the data about the times at which the first job has been executed.

Preferably, the probability distribution forming step includes a time laps measuring sub-step for measuring a lapse of time from the time at which the first job has completed execution, an array sub-step providing array elements corresponding to a plurality of intervals defined by dividing the lapse of time from the completion of the first job execution, an updating sub-step for monitoring occurrences of execution of the first job and updating the value of the array element related to the interval corresponding to the lapse of time after a first job execution occurrence, and a probability distribution computation sub-step computing the probability of first job execution in each interval on the basis of the value of the corresponding array element. Preferably, the length of each of the intervals is set longer than the time period required for processing the second job by the job execution means.

As explained with reference to the figures, the job execution timing control method of the present invention further comprises a comparison step for comparing with a reference value, Tmax, a non-occurrence duration, t, defined as a time period during between execution processing of the first job occurs, and an execution inhibition step for inhibiting the job execution means from again executing the second job until the condition: non-occurrence duration t>reference value Tmax, is satisfied once after execution of the second job. The job execution timing control method may further comprise an interval division step of dividing the lapse of time from the time at which the first job is finished into a plurality of intervals, and which is set as the time start point of the probability distribution, an expectation computation step for computing on the basis of the probability distribution an expectation T1 as a predicted time period before a time after which the second job can be executed after the first job by the job execution means from the end point of one of the intervals in a case where no execution of the first job occurs from the time start point to the end of the interval, a minimum probability interval detection step for detecting one of the intervals corresponding to the minimum probability in the intervals between the time start point and Tm which is the end point of one of the intervals where T1 at the end point of each interval satisfies the condition: T1<reference value Tmax, with respect to the predetermined reference value Tmax, and which is the most remote from the time start point, and the execution timing step for executing the second job with the job execution means in the interval detected in the minimum probability interval detection step. Preferably, the job execution control method further comprises a reference value setting step for controllably setting the reference value Tmax.

As depicted and explained with reference to the figures, a job execution control apparatus, method, and program in accordance with the present invention is disclosed herein to make a computer execute the steps and/or the substeps of the above-described job execution control method of the present invention. With reference to FIG. 1, there is depicted a functional block diagram of a job execution apparatus 10 having a dynamic diagnosis function in accordance with a preferred embodiment of the invention. A job execution means 13 executes a first job 14 and a second job 15. If the job execution means 13 is a tape drive, for example, the first job 14 maybe a processing function for reading data from or writing data to a tape at an irregular time interval, and the second job 15 may be a job based on a function diagnosis program for checking deterioration with time of the tape at a regular time interval. If a device such as a tape drive is connected to a large-scale system, it is maintained in an operating state for a long time once it is started by being powered. In such a situation, it is difficult for the device to be cut off from the power supply and from the system to undergo malfunction diagnosis. If the job execution means 13 is a single tasking-type device, it immediately executes the first job 14 when a request for execution of the first job 14 occurs during a second job non-execution period. During execution of the second job 15, the job execution means 13 postpones execution of the first job 14 until processing of the second job 15 is completed. If the job execution means 13 is a multitasking-type device, it immediately executes the first job 14 immediately after occurrence of a request for execution of the first job 14 regardless of whether the second job 15 is being executed or not being executed. A probability distribution forming means 18 monitors the state of execution of the first job in the job execution means 13, and forms a probability distribution about the occurrence of the first job 14 in the job execution means 13. An execution timing means 19 designates timing for making the job execution means 13 to execute the second job 15 on the basis of the probability distribution formed by the probability distribution forming means 18.

FIG. 2 is a block diagram showing details of the probability distribution forming means 18. A time lapse measuring means 24 detects the completion of processing of the first job 14 in the job execution means 13, and measures a lapse of time from a starting point which is the time at which the processing of the first job 14 is completed. An occurrence data collection means 25 monitors occurrence of the first job 14 in the job execution means 13, and collects the lapse of time measured by the time lapse measuring means 24 each time the first job 14 occurs (the occurrence time with respect to the starting point of the probability distribution). The probability distribution of the occurrence of the first job 14 is divided into a plurality of equal intervals. An array means 27 has array elements corresponding to the equal intervals of the probability distribution. An updating means 26 increases, by a predetermined amount, the value of the array elements corresponding to the occurrence times on the basis of the collected data. The corresponding values of the probabilities in the corresponding intervals shown in FIG. 3 described below are thereby stored as the array elements of the array means 27. A probability distribution computation means 28 computes a probability distribution on the basis of the values of the array elements of the array means 27.

FIGS. 3 and 4 are diagrams showing first and second examples of the probability distributions. A random variable is defined as a lapse of time from a starting point corresponding to a time t=0 at which processing of the first job 14 in the job execution means 13 is finished to the next occurrence of the first job 14 in the job execution means 13. To form the probability distribution, $t1, t2, \ldots, tr-1, tr, \ldots tn-1, tn$ are set at equal intervals of $\Delta t$ from time t=0 along the time axis. The probability in the interval (t0, t1] is p1, the probability in the interval (t1, t2] is p2, . . . , the probability in the interval (tr−1, tr] is pr, and the probability in the interval (tn−1, tn] is pn. While in the probability distribution shown in FIG. 3 the minimum of the probability appears at an intermediate point in the time-axis direction, the probability decreases monotonously in the time-axis direction in the probability distribution shown in FIG. 4. Strictly speaking, pn in the final interval (tn−1, tn] is the probability in (tn−1, ∞].

As $\Delta t$, a time longer than the time required to process the second job 15 in the job execution means 13 is set. In IBM 3580 Ultrium (Ultrium: standard name) sold as a tape drive by the applicant of the present invention, a function diagnosis program for checking deterioration of a memory is executed. If the execution means 13 is this tape drive, the time required for processing of the function diagnosis program is, for example, about 60 seconds and $\Delta t$ is set to a suitable time longer than 60 seconds, e.g. about 300 seconds.

An expectation T1 is then defined as described below. Equations in the following description are shown in FIG. 12 and indicated by corresponding equation numbers. Assuming that processing of the first job 14 ends at an arbitrary time point, the time point is set as a starting point. A certain lapse of time from the starting point is represented by $\Delta t_h = h\Delta t$ (h=1, 2, . . . ). It is assumed that there is no occurrence of the first job 14 during $\Delta t_h$ and the first job 14 then occurs according to the probability distribution. The expectation of the time period between the starting point and the final time point in the certain time period through which no execution of processing of the first job 14 has occurred is set as Th".

When (a) h=1, that is, in a case where no execution of processing of the first job 14 has occurred during $\Delta t_1$ from the starting point, the expectation is as expressed by equation (1).

When (b) h=2, that is, in a case where no execution of processing of the first job 14 has occurred during $\Delta t_2$ from the starting point, the expectation is as expressed by equation (2).

Similarly, equation (3) is obtained as a general equation. This general equation can easily be proved by induction. T1 is defined as the time period from each of the time points defining the first job 14 non-occurrence duration to a time point at which the second job 15 is subsequently executed, i.e., a predicted time period calculated on the basis of the probability distribution of the first job 14.

T1 is used in the job execution apparatus 10 having a dynamic diagnosis function, as described below.

(z1) An upper limit value Tmax (t0≦Tmax≦tn) of T1 is set as desired.

(z2) Tm=max (T1|T1<Tmax, 1=1, 2, 3, . . . , n) is computed.

(z3) A time td at which pd=min (pi|i=1, 2, 3, . . . , m) is obtained. As will be apparent from S55 in FIG. 6, the second job 15 can be started after td−Δt and is executed in the period (td−Δt, td].

FIGS. 5 and 6 are flowcharts showing a routine for controlling the time at which the function diagnosis program is executed. With respect to this routine, it is assumed that the device for executing the first job 14 and the second job 15 is a tape drive and the second job 15 is job using a function diagnosis program. This routine is executed immediately after power for the device is turned on. In step S37, t is reset. In step S38, a determination is made as to whether processing of the first job 14 has occurred in the device (job execution means 12 in this case). If the result of this determination is "yes", a routine for updating the processing occurrence probability distribution is executed in step SA and the process then returns to step S37. If the result of the determination in step S38 is "no", the process advances to step S39. Details of the routine in SA are as described below with reference to FIG. 7. In step S39, t and Tmax are compared. If t>Tmax, that is, if the first job 14 non-execution duration t from power-on exceeds Tmax, the process advances to step S40. If t≦Tmax, the process returns to step S38. Thus, before the first job 14 non-execution duration t from power-on exceeds Tmax, execution of step S56 described below is suspended and a sufficient amount of samples used as a basis for forming the probability distribution is collected. In step S40, td is computed on the basis of the above-described processing (z3), then the process proceeds to S50.

In step S50, a determination is made as to whether processing of the first job 14 has occurred in the device, as is that in step S38. If the result of this determination is "yes", the routine for updating the processing occurrence probability distribution is executed in step SA and the process advances to step S51. If the determination result is "no", the process moves to step S52. In step S51, t is reset and the process then returns to step S50. In step S52, t and Tmax are compared. If t>Tmax, the process advances to step S53. If t≦Tmax, the process moves to step S54. In step S53, a flag is set as "false" and the process returns to step S50. In step S54, a determination is made as to whether the flat is "true" or "false". If the flag is "true", the process returns to step S50. If the flag is "false", the process advances to step S55, in which t and td−Δt are compared. If t>td−Δt, the process advances to step S56. If t≦td−Δt, the process returns to step S50. In step S56, the function diagnosis program is executed. In step S57, the flag is set as "true". Thus, provided that t>Tmax, the second job 15 is executed immediately after t>td−Δt has been satisfied. When t≦Tmax, execution of the second job 15 is suspended regardless of t.

FIG. 7 is a flowchart showing details of step SA shown in FIGS. 5 and 6. The array means 27 shown in FIG. 2 has array elements corresponding to the intervals Δt shown FIGS. 3 and 4. If the array elements are numbered i: 1, 2, 3, . . . n, the value corresponding to the number of occurrences of the first job 14 in the interval (ti−1, ti] in the probability distribution is stored as Vi in the array element i. In step S60, the sum total V of vi is calculated. In step S61, a determination is made as to whether V is larger than a reference value 0xFFF7FFFF (0x denoting figures on the right-hand side thereof represent a hexadecimal value). If the result of this determination is "yes", the process advances to step S63 via step S62. If the result of this determination is "no", the process advances directly to step S63. In step S62, each array element vi is multiplied by 0xFFF7FFFF/V. The value of each array element vi is thereby reduced at a constant rate.

Steps S61 and S62 have significance in avoiding an overflow from the array elements of the array means 27. In step S63, the lapse of time from the completion of processing of the first job 14 performed last time by the job execution means 13 is measured. In step S64, the array element vi corresponding to the lapse of time determined as the occurrence time of the present processing of the first job 14, i.e., the array element vi corresponding to the interval in which the first job 14 has just occurred, is determined. In step S65, the predetermined value 0x0080000 is added to the array element vi determined in step S64. In step S66, the probability pi corresponding to each interval in the probability distribution is computed. Thus, each time processing of the first job 14 occurs in the job execution means 13, the value corresponding to one occurrence is added to the corresponding array element vi and the probability distribution is updated. The probability distribution of occurrence of the first job 14 in the job execution means 13 changes due to environmental changes or the like. However, since the probability distribution is updated each time processing of the first job 14 occurs in the job execution means 13, the probability distribution held by the job execution apparatus 10 having the dynamic diagnosis function sufficiently reflects environmental changes or the like.

FIG. 8 shows three probability distribution patterns obtained as the results of a simulation performed to examine the effect of the above-described proposed method. The patterns shown in sections (a), (b), and (c) of FIG. 8 will be respectively referred to as first, second, and third patterns of the function diagnosis program. The largest abscissa value is set as a day. In the first pattern of the function diagnosis program, the probability decreases linearly with time. In the second pattern of the function diagnosis program, the probability changes periodically between the maximum value and a value substantially equal to zero. In the third pattern of the function diagnosis program, the probability decreases generally by repeating increasing and decreasing.

FIG. 9 shows the results of a simulation about the rate of overlapping between the first job 14 and the second job 15 when the second job 15 is executed by the conventional method and the proposed method in accordance with the present invention with respect to each pattern of the function diagnosis program shown in FIG. 8. The device failure rate is supposed to be $9.5 \times 10^{-2}$ times/year in each of the case shown in FIG. 9 and the case described below with reference to FIG. 11. It can be understood that the overlapping rate is remarkably reduced in the case of the proposed method in accordance with the present invention with respect to each of the first to third patterns in comparison with the conventional method.

FIG. 10 shows three probability distribution patterns obtained as the results of another simulation performed to examine the effect of the above-described proposed method. The patterns shown in sections (a), (b), and (c) of FIG. 10 will be respectively referred to as fourth, fifth, and sixth patterns of the function diagnosis program. The largest abscissa value is set as a day. In each of the fourth to sixth patterns, the decreasing rate is high at an earlier time and is thereafter reduced. The probability with respect to the intervals, including that at the starting point, is highest in the fourth pattern, and lowest in the sixth pattern.

FIG. 11 shows the results of a simulation about the rate of overlapping between the first job 14 and the second job 15 when the second job 15 is executed by the conventional method and the proposed method in accordance with the present invention with respect to each pattern of the function diagnosis program shown in FIG. 10. From these results, it can be understood that the overlapping rate is remarkably reduced in the case of the proposed method in accordance with the present invention with respect to each pattern in comparison with the conventional method.

A method, system, and program product have been disclosed for controlling the execution timing of jobs in such a manner that while execution of one job occurs at irregular and singularly unforeseeable time intervals, another job can be executed while limiting execution overlap with the former. Although the present invention has been described in accordance with the embodiments shown, one of ordinary skill in the art will readily recognize that there could be variations to the embodiments and those variations would be within the spirit and scope of the present invention. Accordingly, many modifications maybe made by one of ordinary skill in the art without departing from the spirit and scope of the appended claims.

The invention claimed is:

1. A system for controlling execution timing of jobs, comprising:
   job execution means for executing a plurality of jobs, wherein said plurality of jobs includes a first job executed at irregular time intervals and a second job executed at regular time intervals;
   probability distribution forming means for determining a probability distribution in accordance with times at which execution of said first job occurs, wherein the starting point of the probability distribution is set at the time at which said first job has completed execution, and wherein said probability distribution forming means includes:
   time lapse measuring means for measuring a lapse of time from the time at which the first job execution is finished;
   array means having array elements corresponding to a plurality of intervals defined by dividing the lapse of time from the time at which said first job execution is finished;
   updating means for:
   monitoring occurrences of execution of the first job; and
   updating the value of the array element related to the interval corresponding to the lapse of time after an occurrence of execution of said first job; and
   probability distribution computation means for computing the probability of occurrence of execution of said first job in each interval on the basis of the value of the corresponding array element; and
   execution timing means for scheduling execution of said second job in accordance with said probability distribution.

2. The system according to claim 1, wherein said probability distribution forming means includes means for determining the probability distribution with respect to time zones, week-day zones and/or seasonal zones, and
   wherein said execution timing means schedules execution of said second job on the basis of the probability distribution according to the current time, the current day in a week and/or the current season.

3. The system according to claim 1, wherein said probability distribution forming means includes means for determining the probability distribution in accordance with a predetermined number of latest data items in a predetermined last period in the data at approximately the times at which execution of said first job has occurred.

4. The system according to claim 1, wherein the length of each of the intervals is set longer than the time period required for processing said second job.

5. The system according to claim 1, further comprising:
   comparison means for comparing a reference duration value, Tmax, with a non-occurrence duration, t, defined as a time period between execution of said first job; and
   execution inhibition means for inhibiting said job execution means from executing the second job until a condition: t>Tmax is satisfied once after execution of said second job.

6. The system according to claim 5, further comprising:
   interval division means for dividing the lapse of time from the time at which said first job is finished into a plurality of intervals, wherein the time at which said first job is finished is set as the time start point of said probability distribution;
   expectation computation means, responsive to no execution of said first job from said time start point to the end of a first interval among said plurality of intervals, for utilizing said probability distribution to compute an expectation T1 as a predicted time period prior to a time at which said second job can be executed after completed execution of said first job from the end point of one of said plurality of intervals;
   minimum probability interval detection means for detecting one of said plurality of intervals that corresponds to the minimum probability among said plurality of intervals between said time start point and Tm, wherein Tm is the end point of one of the intervals in which T1 at the end point of each interval satisfies a condition: T1<Tmax with respect to the predetermined reference value Tmax, and which is the furthest from the time start point; and execution timing means for scheduling the execution of second job in the interval detected by said minimum probability interval detection means.

7. The system according to claim 6, further comprising reference value setting means for controllably setting Tmax.

a pair of complementary data inputs;

a pair of data path pass-transistor logic (PTL) transistors configured as pass-gates with respect to each of said pair of complementary data inputs and having the PTL transistor gate terminals connected to a control node, wherein said pair of data path PTL transistors pass data from said pair of complementary data inputs into a pair of complementary storage nodes in response to a latch trigger pulse applied to said control node; and a pulse generator that passes said latch trigger pulse to said control node in response to a clock signal transition.

8. A method for controlling execution timing of jobs, comprising:

executing a plurality of jobs, wherein said plurality of jobs includes a first job executed at irregular time intervals and a second job executed at regular time intervals;

determining a probability distribution in accordance with times at which execution of said first job occurs, said determining further comprising:

setting the starting point of the probability distribution to the time at which said first job has completed execution;

measuring a lapse of time from the time at which the first job execution is finished;

generating array elements corresponding to a plurality of intervals defined by dividing the lapse of time from the time at which said first job execution is finished;

monitoring occurrences of execution of the first job;

updating the value of the array element related to the interval corresponding to the lapse of time after an occurrence of execution of said first job; and computing the probability of occurrence of execution of said first job in each interval on the basis of the value of the corresponding array element; and scheduling execution of said second job in accordance with said probability distribution.

9. The method according to claim 8, further comprising:

determining the probability distribution with respect to time zones, week-day zones and/or seasonal zones, and scheduling execution of said second job on the basis of the probability distribution according to the current time, the current day in a week and/or the current season.

10. The method according to claim 8, further comprising determining the probability distribution in accordance with a predetermined number of latest data items in a predetermined last period in the data at approximately the times at which execution of said first job has occurred.

11. The method according to claim 8, further comprising setting the length of each of the intervals longer than the time period required for processing said second job.

12. The method according to claim 8, further comprising:

comparing a reference duration value, Tmax, with a non-occurrence duration, t, defined as a time period between execution of said first job; and inhibiting executing the second job until a condition: t>Tmax is satisfied once after execution of said second job.

13. The method according to claim 12, further comprising:

dividing the lapse of time from the time at which said first job is finished into a plurality of intervals, wherein the time at which said first job is finished is set as the time start point of said probability distribution;

responsive to no execution of said first job from said time start point to the end of a first interval among said plurality of intervals, utilizing said probability distribution to compute an expectation T1 as a predicted time period prior to a time at which said second job can be executed after completed execution of said first job from the end point of one of said plurality of intervals;

detecting one of said plurality of intervals that corresponds to the minimum probability among said plurality of intervals between said time start point and Tm, wherein Tm is the end point of one of the intervals in which T1 at the end point of each interval satisfies a condition: T1<Tmax with respect to the predetermined reference value Tmax, and which is the furthest from the time start point; and scheduling the execution of second job in the interval detected by said minimum probability interval detection means.

14. The method according to claim 13, further comprising controllably setting Tmax.

15. A computer-readable medium having stored thereon computer-executable instructions for controlling execution timing of jobs, said computer-executable instructions adapted for performing a method comprising:

executing a plurality of jobs, wherein said plurality of jobs includes a first job executed at irregular time intervals and a second job executed at regular time intervals;

determining a probability distribution in accordance with times at which execution of said first job occurs, said determining further comprising:

setting the starting point of the probability distribution to the time at which said first job has completed execution;

measuring a lapse of time from the time at which the first job execution is finished;

generating array elements corresponding to a plurality of intervals defined by dividing the lapse of time from the time at which said first job execution is finished;

monitoring occurrences of execution of the first job;

updating the value of the array element related to the interval corresponding to the lapse of time after an occurrence of execution of said first job; and computing the probability of occurrence of execution of said first job in each interval on the basis of the value of the corresponding array element; and scheduling execution of said second job in accordance with said probability distribution.

16. The computer-readable medium according to claim 15, said method further comprising:

determining the probability distribution with respect to time zones, week-day zones and/or seasonal zones, and scheduling execution of said second job on the basis of the probability distribution according to the current time, the current day in a week and/or the current season.

17. The computer-readable medium according to claim 15, said method further comprising determining the probability distribution in accordance with a predetermined number of latest data items in a predetermined last period in the data at approximately the times at which execution of said first job has occurred.

18. The computer-readable medium according to claim 15, said method further comprising setting the length of each of the intervals longer than the time period required for processing said second job.

19. The computer-readable medium according to claim 15, further comprising:
comparing a reference duration value, Tmax, with a non-occurrence duration, t, defined as a time period between execution of said first job; and
inhibiting executing the second job until a condition: t>Tmax is satisfied once after execution of said second job.

20. The computer-readable medium according to claim 19, said method further comprising:
dividing the lapse of time from the time at which said first job is finished into a plurality of intervals, wherein the time at which said first job is finished is set as the time start point of said probability distribution;
responsive to no execution of said first job from said time start point to the end of a first interval among said plurality of intervals, utilizing said probability distribution to compute an expectation T1 as a predicted time period prior to a time at which said second job can be executed after completed execution of said first job from the end point of one of said plurality of intervals;
detecting one of said plurality of intervals that corresponds to the minimum probability among said plurality of intervals between said time start point and Tm, wherein Tm is the end point of one of the intervals in which T1 at the end point of each interval satisfies a condition: T1<Tmax with respect to the predetermined reference value Tmax, and which is the furthest from the time start point; and
scheduling the execution of second job in the interval detected by said minimum probability interval detection means.

21. The computer-readable medium according to claim 20, said method further comprising controllably setting Tmax.

* * * * *